US008690343B2

(12) United States Patent
Tanaka (10) Patent No.: US 8,690,343 B2
(45) Date of Patent: Apr. 8, 2014

(54) SOLID STATE LIGHT SOURCE AND PROJECTION DISPLAY APPARATUS HAVING A FLUORESCENCE EMISSION PLATE

(75) Inventor: Takaaki Tanaka, Osaka (JP)

(73) Assignee: Panasonic Corporation, Osaka (JP)

(*) Notice: Subject to any disclaimer, the term of this patent is extended or adjusted under 35 U.S.C. 154(b) by 135 days.

(21) Appl. No.: 13/307,909

(22) Filed: Nov. 30, 2011

(65) Prior Publication Data

US 2012/0133903 A1    May 31, 2012

(30) Foreign Application Priority Data

Nov. 30, 2010   (JP) ................................ 2010-266154

(51) Int. Cl.
   *G03B 21/00*     (2006.01)
(52) U.S. Cl.
   USPC ............... 353/31; 353/30; 353/38; 353/84; 353/85; 353/98; 362/231; 362/293; 348/743; 348/744
(58) Field of Classification Search
   USPC ........... 353/20, 22, 30–31, 37, 38, 84, 85, 94, 353/98, 99; 362/231, 20, 31, 284, 293, 324, 362/555, 583; 349/5, 7–9; 348/743–749, 348/761, 833, E13.014, E13.02, E13.022, 348/E13.029, E13.03, E13.033, E13.038, 348/E13.058, E13.065, E13.071, E9.027
   See application file for complete search history.

(56) References Cited

U.S. PATENT DOCUMENTS

| 6,240,116 | B1 | 5/2001 | Lang et al. |
| 7,152,981 | B2* | 12/2006 | Eckhardt ........................ 353/98 |
| 7,547,114 | B2* | 6/2009 | Li et al. ........................ 362/231 |
| 8,220,931 | B2* | 7/2012 | Silverstein et al. ............. 353/20 |
| 2006/0221305 | A1* | 10/2006 | Magarill ........................ 353/31 |
| 2011/0019112 | A1* | 1/2011 | Dolgoff ............................ 349/8 |
| 2011/0084609 | A1* | 4/2011 | Kawaguchi et al. ........... 315/77 |
| 2011/0187998 | A1* | 8/2011 | Kimura et al. ................. 353/20 |

FOREIGN PATENT DOCUMENTS

| JP | 2004-341105 | 12/2004 |
| JP | 4037691 | 11/2007 |
| JP | 4169720 | 8/2008 |

* cited by examiner

*Primary Examiner* — Sultan Chowdhury
(74) *Attorney, Agent, or Firm* — Hamre, Schumann, Mueller & Larson, P.C.

(57) ABSTRACT

A light source device includes: first and second solid-state light source units disposed opposite to each other, each unit including solid-state light sources; a reflection unit; a condensing part; and a fluorescence emission plate excited with a condensed light beam. The light sources in each of the units are arranged two-dimensionally with the optical axes oriented in an x-axis direction. Each column of the light sources of the first and the second light source units are arranged alternately in the y-axis direction. The reflection unit reflects the light beams from the light source units in the z-axis direction so as to be arranged into a two-dimensional array in a xy plane. A density of the reflected light beams in the x-axis direction is higher than that of the arrangement of the light sources in the z-axis direction. Light from solid-state light sources are condensed and combined efficiently, with a compact configuration.

4 Claims, 8 Drawing Sheets

SOLID STATE LIGHT SOURCE AND PROJECTION DISPLAY APPARATUS HAVING A FLUORESCENCE EMISSION PLATE

BACKGROUND OF THE INVENTION

1. Field of the Invention

The present invention relates to a light source device configured to combine light from a plurality of solid-state light sources so as to excite a phosphor, and a projection display apparatus illuminating an image on a light valve with illumination light from the light source device so as to magnify and project the image.

2. Description of Related Art

A discharge lamp has been used widely as a light source of a projection display apparatus that uses a light valve composed of a liquid crystal or a mirror-deflection type digital micromirror device (DMD). However, since the discharge lamp has the problem of a short life, the reliability is low. Therefore, in order to solve this problem, recently, solid-state light sources such as a semiconductor laser and a light-emitting diode have been studied for use as the light source of the projection display apparatus.

Figure 10:
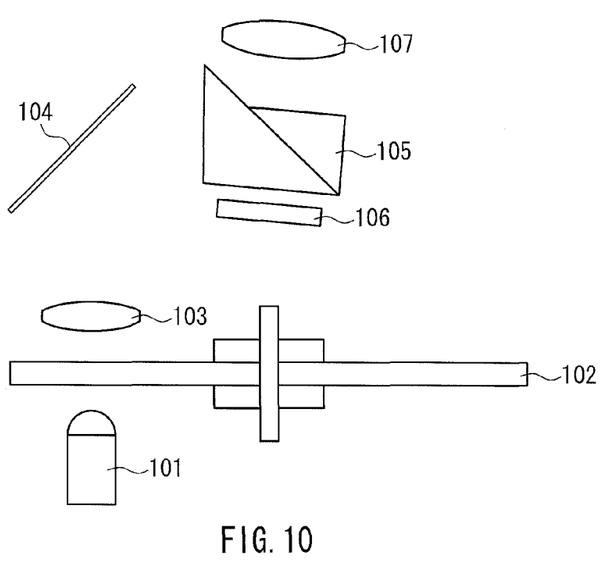
FIG. 10 is a front view showing a configuration of a conventional projection display apparatus.

FIG. 10 shows a configuration disclosed in JP 2004-341105 A as an example of a conventional projection display apparatus using a solid-state light source and a DMD. Ultraviolet light from a light-emitting diode 101 enters a disk-shaped color wheel 102. On the color wheel 102, a reflective film for transmitting ultraviolet light and reflecting visible light is formed. The exit-side surface of the reflective film is divided in a circumferential direction of the disk into three regions, and red, green and blue phosphor layers are formed on the respective regions, so that red, green and blue color lights are emitted by the incident ultraviolet light. The emitted light is transmitted through and reflected by a relay lens 103, a reflection mirror 104 and a prism 105, thereby entering a DMD 106. The light entered is modulated by the DMD 106 in accordance with a video signal, and the modulated light is magnified and projected by a projection lens 107.

Generally, the solid-state light source such as a light-emitting diode and a semiconductor laser emits lower amounts of light beams as compared with the discharge lamp. Because of this, it is difficult for the configuration shown in FIG. 10 to obtain high brightness. Therefore, studies have been done to obtain high-brightness light beams by combining light from a plurality of solid-state light sources.

Figure 11:
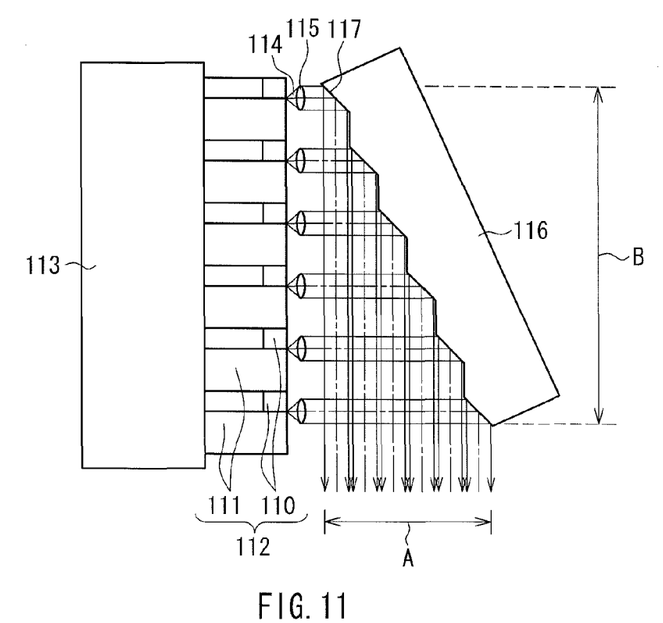
FIG. 11 is a front view showing a configuration of a conventional light source device.

FIG. 11 shows an exemplary light source device disclosed in U.S. Pat. No. 6,240,116 A, which is configured for combining light beams from a plurality of solid-state light sources with high density. A solid-state light source unit is composed of a laser bar 112 including pluralities of semiconductor lasers 110 and heat-dissipation plates 111, and a cooling unit 113. Each of light beams 114 exiting from the solid-state light source unit is condensed by a corresponding lens 115 and reflected by a stepped reflective surface 117 of a reflector 116. A width A of exiting light beams from the reflector 116 is smaller than a width B of light beams from the laser bar 112. Thereby, it is possible to obtain light beams combined densely and configure a compact solid-state light source device.

In the case of the light source device combining a plurality of solid-state light sources, in view of cooling performance, the plurality of solid-state light sources are disposed discretely at a predetermined interval. Therefore, as the number of the solid-state light source increases, an outline of exiting light beams becomes larger, which increases the size of the light source device.

The configuration described in U.S. Pat. No. 6,240,116 A that uses the stepped reflective surface 117 shown in FIG. 11 is effective in view of downsizing the solid-state light source unit composed of a plurality of solid-state light sources (semiconductor lasers 110) of a relatively small number. In other words, the divergence angle of the light beams from the solid-state light sources substantially is ±10° in a narrow direction, and a focal length of the condensing lens 115 may be determined so that light of this angle is taken in and converted into parallel light.

However, when light from an increased number of solid-state light sources is condensed within a predetermined outline of exiting light beams, the periodic interval of the semiconductor lasers 110 becomes narrow. Because of this, when the condensing lens 115 of the same focal length is used, the angle for condensing light becomes small, and hence light from the semiconductor lasers 110 cannot be condensed efficiently. On the other hand, when the condensing lens 115 of shortened focal length is used so as to narrower the width of exiting light beam from a single solid-state light source, an influence due to displacement between an emitting point of the condensing lens 115 and an emitting point of the solid-state light source increases, which increases the light loss during a transmission along a long optical path.

SUMMARY OF THE INVENTION

The object of the present invention is to provide a bright, compact light source device capable of condensing and combining light from a plurality of solid-state light sources efficiently.

Further, the object of the present invention is to provide a high-brightness projection display apparatus composed using such a light source device.

A light source device of the present invention includes: first and second solid-state light source units that are disposed opposite to each other, each unit including a plurality of solid-state light sources and a plurality of condensing lenses; a reflection unit that reflects exiting light beams from the first and second solid-state light source units in one direction; a first condensing part that condenses reflected light beams from the reflection unit; and a fluorescence emission plate that is excited with light condensed by the first condensing part and emits fluorescence. The plurality of solid-state light sources in each of the first and second solid-state light source units are arranged two-dimensionally with optical axes thereof being oriented to an x-axis direction in a yz plane in a rectangular coordinate system composed of x, y and z axes. Each column of the solid-state light sources aligned in the z-axis direction in the first solid-state light source unit and each column of the solid-state light sources aligned in the z-axis direction in the second solid-state light source unit are arranged alternately in the y-axis direction. The reflection unit is disposed so as to reflect each of the exiting light beams from the first and second solid-state light source units in the z-axis direction and arrange the reflected light beams into a two-dimensional array in a xy plane, in which a density of the reflected light beams in the x-axis direction is higher than a density of an arrangement of the solid-state light sources in the z-axis direction.

Further, a first projection display apparatus of the present invention includes: a white light source device that emits white light; an illumination portion that condenses light from the white light source device so as to form illumination light;

a color separation portion that color separates the illumination light into blue, green and red color lights; three liquid crystal light valves that spatially modulate separated color lights so as to form image lights, respectively; a color combining portion that combines image lights of blue, green and red color lights emitted from the liquid crystal light valves, respectively; and a projection lens that magnifies and projects an image combined by the color combining portion. The white light source device is composed using the light source device of the above-described configuration.

A second projection display apparatus of the present invention includes: a color light source device that emits green, red and blue color lights in time series; an illumination portion that condenses light from the color light source device so as to form illumination light; a mirror-deflection type light valve that spatially modulates the illumination light so as to form image light; and a projection lens that magnifies and projects image light formed by the mirror-deflection type light valve. The color light source device is composed using the light source device of the above-described configuration.

According to the light source device of the above-described configuration, since respective columns of the solid-state light sources aligned in the z-axis direction in a pair of opposed solid-state light source units are arranged alternately in the y-axis direction, and the density of exiting light beams from the solid-state light sources is increased in the x-axis direction by the reflection unit, it is possible to condense and combine light from a plurality of solid-state light sources efficiently and configure a bright, compact light source device.

According to the projection display apparatus of the above-described configuration, by using the light source device of the present invention, it is possible to configure a long-life, bright projection display apparatus.

DETAILED DESCRIPTION OF THE INVENTION

Based on the configuration described above, a light source device of the present invention can be modified as below.

That is, each of the first and second solid-state light source units can be divided into a plurality of sections in the z-axis direction so as to be configured as a collective of solid-state light source subunits each including a plurality of the solid-state light sources and a plurality of the condensing lenses.

Further, each row of the solid-state light sources aligned in the y-axis direction in the first solid-state light source unit can be arranged alternately in the z-axis direction with respect to each row of the solid-state light sources aligned in the y-axis direction in the second solid-state light source unit, whereby the plurality of the solid-state light sources of the first and second solid-state light source units form a staggered arrangement in the yz plane.

The solid-state light source can be a blue semiconductor laser. Further, preferably, light emitted from the solid-state light source is linearly polarized light.

Further, the reflection unit can be composed of reflection mirrors disposed so that light from the plurality of solid-state light sources enters the mirrors at an incident angle of 45°.

Further, of reflection mirrors constituting the reflection unit, a reflection mirror reflecting a light beam from the first solid-state light source unit can be a partial-area reflection mirror transmitting light having been reflected by a reflection mirror reflecting a light beam from the second solid-state light source unit.

Preferably, the fluorescence emission plate is circular and can be controlled to rotate.

Further, preferably, the fluorescence emission plate has a phosphor layer disposed on a light incident side thereof and a reflective film disposed opposite to a light incident direction with respect to the phosphor layer.

Further, a phosphor layer of the fluorescence emission plate can be formed of a Ce-activated YAG yellow phosphor.

Further, preferably, a diffusion plate is disposed between the reflection unit and the first condensing part.

Further, the light source device can be configured to include a dichroic mirror that polarization separates light from the first condensing part into a first polarization component and a second polarization component and that combines blue color light and green and red color lights; a retardation plate that converts a polarization direction of the second polarization component; and a reflection plate that reflects light having been transmitted through the retardation plate so that the light reenters the retardation plate, wherein the first polarization component enters the fluorescence emission plate and fluorescence emitted is reflected toward the dichroic mirror, and green and red color lights from the fluorescence emission plate and blue color light from the reflection plate are combined by the dichroic mirror and exit as white light. The retardation plate can be a quarter wave plate.

Further, the light source device can be configured to include a dichroic mirror that reflects light from the first condensing part, and separates or combines blue color light and green and red color lights; a light-emitting diode; and a second condensing part that condenses light radiated from the light-emitting diode, wherein the fluorescence emission plate is excited by light from the first condensing part having been reflected by the dichroic mirror and fluorescence emitted is reflected toward the dichroic mirror, and color light from the fluorescence emission plate and color light from the light-emitting diode having been condensed by the second condensing part are combined by the dichroic mirror and exit as white light.

In the first projection display apparatus of the above-described configuration of the present invention, the liquid crystal light valve can be composed using a transmission-type liquid crystal panel.

In the second projection display apparatus of the above-described configuration of the present invention, the color light source device can include: a dichroic mirror that reflects light from the first condensing part, and separates or combines blue color light and green and red color lights; a light-emitting diode that emits blue color light; and a second condensing part that condenses light radiated from the light-emitting diode. The fluorescence emission plate is excited by light from the first condensing part having been reflected by the dichroic mirror and the fluorescence emitted is reflected toward the dichroic mirror. Color light from the fluorescence emission plate and color light from the light-emitting diode having been condensed by the second condensing part are combined by the dichroic mirror and exit from the dichroic mirror. The fluorescence emission plate is divided in a rotation direction so that a green phosphor region emitting fluorescent light of green color component, a red phosphor region emitting fluorescent light of red color component and a transmission region are formed. The light-emitting diode is caused to emit light only in a period in which light from the first condensing part passes through the transmission region, and at the same time, light emission of the plurality of solid-state light sources is caused to stop.

Hereinafter, embodiments of the present invention will be described with reference to the drawings.

Embodiment 1

Figure 1A:
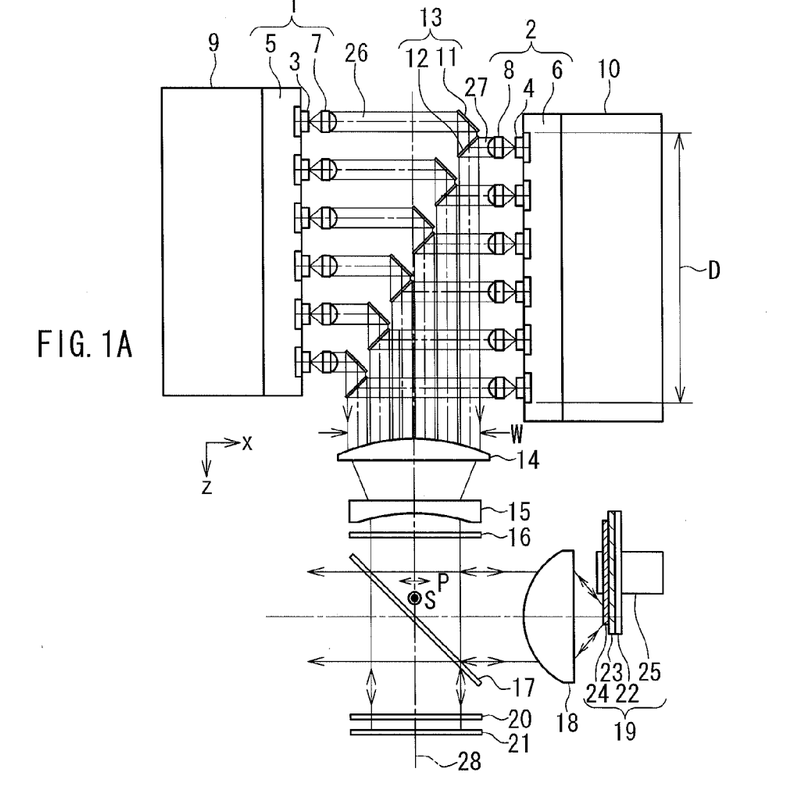
FIG. 1A is a front view showing a configuration of a light source device according to Embodiment 1 of the present invention.

FIG. 1A is a front view showing a configuration of a light source device according to Embodiment 1 of the present invention. The light source device has a characteristic of efficiently condensing and combining light beams from a plurality of semiconductor lasers contained in a pair of first and second solid-state light source units 1, 2 that are disposed opposite to each other, with a compact configuration.

The first and second solid-state light source units 1, 2 include blue semiconductor lasers 3, 4, heat-dissipation plates 5, 6, and condensing lenses 7, 8, respectively. The heat-dissipation plates 5, 6 are equipped with heat sinks 9, 10, respectively. A reflection unit 13 composed of total-area reflection mirrors 11 and partial-area reflection mirrors 12 are provided between the first and second solid-state light source units 1, 2, thereby reflecting light beams from the semiconductor lasers 3, 4 in one direction.

A first condensing part composed of lenses 14, 15, and a diffusion plate 16 are disposed in a reflection direction from the reflection unit 13. A dichroic mirror 17 for polarization-separating light is disposed on an exit side of the diffusion plate 16. A condenser lens 18 and a fluorescence emission plate 19 are disposed in an exit direction of one of the polarization-separated light (first polarization component), and a retardation plate 20 and a reflection plate 21 are arranged in an exit direction of the other light (second polarization component). The fluorescence emission plate 19 is formed by disposing a reflective film 23 and a phosphor layer 24 on a circular glass substrate 22, and can be controlled to rotate with a motor 25.

Directions indicated by x and z in the drawing are directions of x and z axes in a rectangular coordinate system composed of x, y and z axes. In the drawing, states of light beams 26, 27 emitted from the first and second solid-state light source units 1, 2, respectively, and an optical axis 28 of the light source device are illustrated.

Figure 1B:
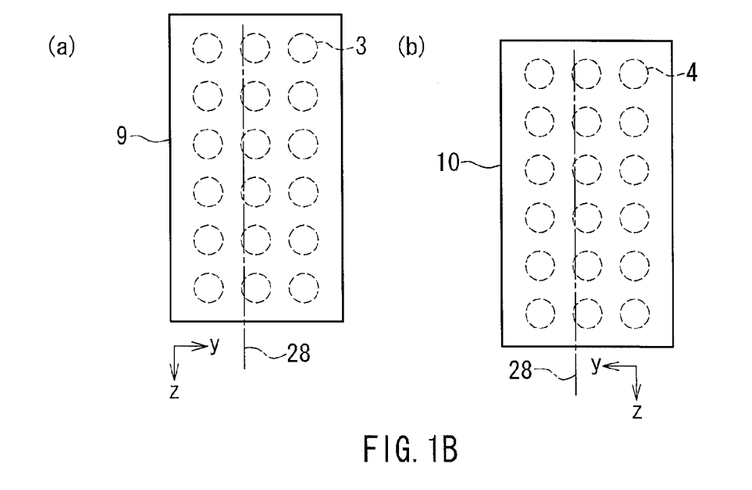
FIG. 1B shows a portion of a solid-state light source unit of the light source device: (a) is a left side view thereof, and (b) is a right side view thereof.

FIG. 1B(a) shows a left side view of the first solid-state light source unit 1 as viewed through the heat sink 9, and FIG. 1B(b) shows a right side view of the second solid-state light source unit 2 as viewed through the heat sink 10. In these drawings, arrangement states of semiconductor lasers 3, 4 in the first and second solid-state light source units 1, 2 are indicated by broken lines.

In each of the first and second solid-state light source units 1, 2, eighteen (6×3) semiconductor lasers 3, 4 are disposed two-dimensionally on the heat-dissipation plates 5, 6 at a certain interval, and the condensing lenses 7, 8 are disposed so as to correspond to the semiconductor lasers 3, 4, respectively. The blue semiconductor lasers 3, 4 emit linearly polarized light having a wavelength ranging from 440 nm to 455 nm. The semiconductor lasers 3, 4 are disposed in a yz plane so that their optical axes are oriented in the x-axis direction. The heat sinks 9, 10 are provided so as to cool the first and second solid-state light source units 1, 2, respectively.

Each column of the semiconductor lasers 3 aligned in the z-axis direction in the first solid-state light source unit 1 is arranged so as to have an alternate positional relationship (alternate arrangement) in the y-axis direction with respect to each column of the semiconductor lasers 4 aligned in the z-axis direction in the second solid-state light source unit 2. In other words, each column of the semiconductor lasers 4 (or 3) is disposed opposite to a midpoint position of two adjacent columns of the plurality of semiconductor lasers 3 (or 4).

Further, also in the z-axis direction, each row of the semiconductor lasers 3 aligned in the y-axis direction and each row of the semiconductor lasers 4 aligned in the y-axis direction form an alternate arrangement. Thereby, the semiconductor lasers 3, 4 form a staggered arrangement in the yz plane. By adopting such a staggered arrangement, it is possible to increase the periodic arrangement margin in the y-axis direction.

Lights emitted from the plurality of semiconductor lasers 3, 4 are condensed by the corresponding condensing lenses 7, 8 and converted into parallel light beams 26, 27, respectively. The light beam 26 from the semiconductor laser 3 is reflected by the total-area reflection mirror 11 at an incident angle of 45°, transmitted through the partial-area reflection mirror 12, and enters the lens 14. The light beam 27 from the semiconductor laser 4 is reflected by the partial-area reflection mirror 12 at an incident angle of 45°, and enters the lens 14.

In this manner, the reflection unit 13 reflects the exiting light beams from the first and second solid-state light source units 1, 2 in the z-axis direction, and arrays the reflected light beams two-dimensionally in a xy plane. Further, as described below, the reflection unit 13 is disposed so that a density of the reflected light beams in the x-axis direction is higher than a density of the arrangement of the semiconductor lasers 3, 4 in the z-axis direction.

It the xz plane, θ is defined as an angle formed by the optical axis 28 and a line that connects intersections of the optical axes of the semiconductor lasers 4 and reflective surfaces of the respective partial-area reflection mirrors 12. Further, a width of the exiting light beams of the second solid-state light source unit 2 is assumed to be D, and a width of the reflected light beams exiting from the reflection unit 13 is assumed to be W. The relationship between θ, D and W is expressed by Formula (I) below.

$$\tan\theta = W/D \quad \text{(Formula 1)}$$

Therefore, when the angle θ is less than 45°, the width W of the reflected light beams can be smaller than the width D of the exiting light beams. In the configuration of FIG. 1, the plurality of partial-area reflection mirrors 12 are disposed so that the angle θ becomes 21.5°, whereby the light beam width W is reduced to 38% with respect to the light beam width D. The plurality of total-area reflection mirrors 11 are disposed similarly. Note here that the staggered arrangement of the semiconductor lasers 3, 4 is not essential for obtaining such an effect. The effect can be obtained sufficiently also in a case where each column of the semiconductor lasers 3 and each column of the semiconductor lasers 4 are arranged alternately in the y-axis direction and aligned in the same row in the z-axis direction.

Figure 2:
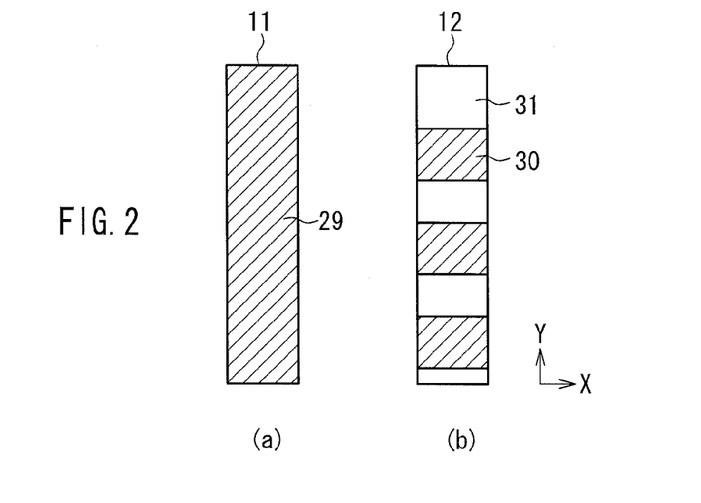
FIG. 2 shows configurations of reflection mirrors in a reflection unit of the light source device.

FIG. 2 shows configurations of the total-area reflection mirror 11 and the partial-area reflection mirror 12. As shown in FIG. 2(a), the total-area reflection mirror 11 is a rectangular mirror in which an aluminum reflective film 29 is formed on an entire surface of the glass substrate. As shown in FIG. 2(b), the partial-area reflection mirror 12 is a rectangular, partial-transmission mirror in which an aluminum reflective film 30 and a transmission surface 31 with an antireflection film are arranged alternately in the y-axis direction on the glass substrate. The aluminum reflective film has a characteristic of having a reflectance peak in the vicinity of 445 nm. The partial-area reflection mirror 12 may have a configuration in which only the aluminum reflective film 30 region is provided, and a space is formed instead of the transmission surface 31. However, by configuring the mirror to include a partial transmission region, it is possible to unify a mirror composed of three into one mirror. Such a configuration is advantageous in facilitating a mirror holding mechanism.

Figure 3:
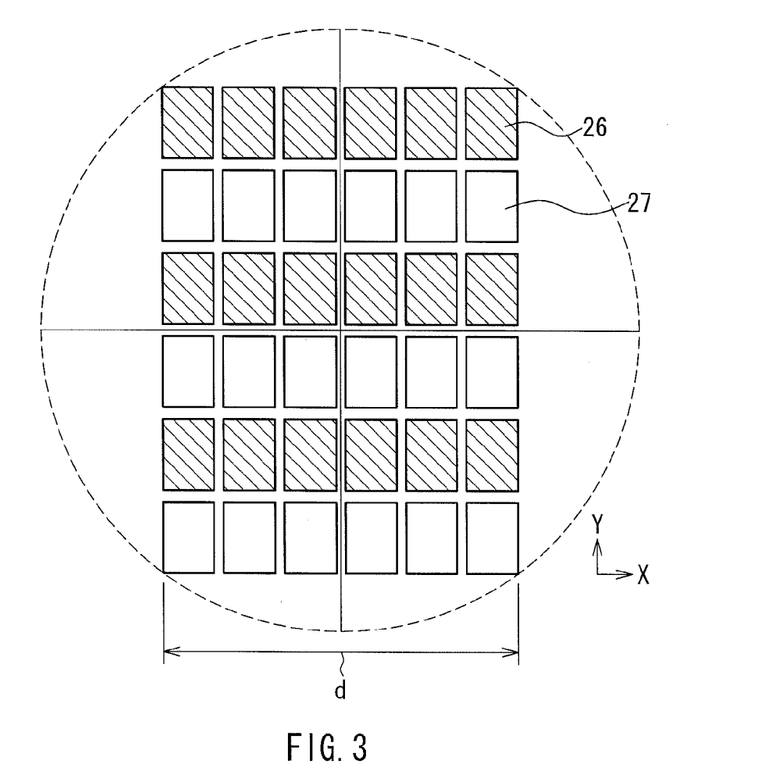
FIG. 3 shows a state of a combined light beam in the light source device.

FIG. 3 shows a state of combined light beams exiting from the reflection unit 13, at an exit surface of the reflection unit 13. Hatched regions show the light beams 26 of the first solid-state light source unit 1, and the other regions shows the light beams 27 of the second solid-state light source unit 2. A circular broken line shows an outer boundary of a group of these light beams. A "d" indicates a width of the combined light beams in the x-axis direction. As shown in the drawing, the light beams from the plurality of solid-state light source units 1, 2 are combined densely within the circular region. Therefore, the light beams of the first and second solid-state light source units 1, 2 can be combined into a compact form efficiently even when the focal length and the light beam width of the condensing lenses 7, 8 are the same as the case of using one solid-state light source unit.

As described above, a pair of the first and second solid-state light source units 1, 2 and the reflection unit 13 make it possible to condense and combine exiting light beams from the plurality of semiconductor lasers 3, 4 efficiently. Note here that each of the first and second solid-state light source units 1, 2 may be divided into a plurality of sections in the z-axis direction and configured as a collective of a plurality of solid-state light source subunits. In that case, the solid-state light source subunits include a plurality of semiconductor lasers 3, 4 and a plurality of condensing lenses 7, 8, respectively. Thereby, as compared with the case of configuring each of the first and second solid-state light source units 1, 2 integrally, heat generation from the semiconductor lasers 3, 4 can be avoided easily.

The diameter of the group of the light beams that entered the lens 14 of FIG. 1 is reduced further by the first condensing part composed of the convex lens 14 and the concave lens 15. The exiting light from the lens 15 of the first condensing part enters the diffusion plate 16. The diffusion plate 16 is made of glass, and diffuses light with a fine rugged pattern on its surface. The light from the diffusion plate 16 enters the dichroic mirror 17. The drawing shows a polarization direction of light entering the dichroic mirror 17.

Figure 4:
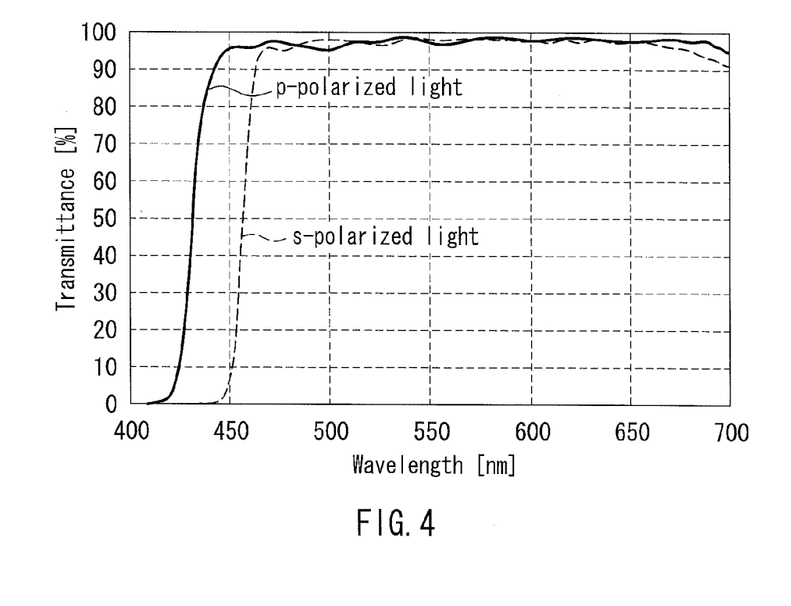
FIG. 4 is a graph showing a spectral characteristic of a dichroic mirror of the light source device.

The semiconductor lasers 3, 4 of the first and second solid-state light source units 1, 2 are disposed so that about 20% of the exiting light enters the dichroic mirror 17 as p-polarized light and about 80% thereof enters the dichroic mirror 17 as s-polarized light. FIG. 4 shows a spectral characteristic of the dichroic mirror 17. The dichroic mirror 17 reflects s-polarized light of semiconductor laser light in the vicinity of a wavelength of 445 nm, transmits p-polarized light, and transmits green and red color lights.

The light beams of the s-polarized light reflected by the dichroic mirror 17 in FIG. 1 are condensed by the condenser lens 18, superimposed as a spot light having a diameter of 1 mm to 3 mm and whose optical intensity is 13.5% with respect to the peak intensity, and then enters the fluorescence emission plate 19. The diffusion plate 16 diffuses light so that the spot light will have a desired diameter. The reflective film 23 of the fluorescence emission plate 19 is a dielectric thin film reflecting visible light. The phosphor layer 24 is formed of a Ce-activated YAG yellow phosphor that is excited by blue component light and emits yellow color light containing green and red components. A representative chemical composition of the crystal matrix of this phosphor is $Y_3Al_5O_{12}$. The phosphor layer 24 is formed in an annular shape.

The phosphor layer 24 that is excited by the spot light emits green and red component lights. By rotating the fluorescence emission plate 19, temperature rise of the phosphor due to excitation light can be suppressed, and thus the fluorescence conversion efficiency can be maintained stably. The green and red color component lights emitted from the phosphor layer 24 exit from the fluorescence emission plate 19, or are reflected by the reflective film 23 and exit from the fluorescence emission plate 19. The green and red color lights exiting from the fluorescence emission plate 19 are condensed by the condenser lens 18 again, converted into substantially parallel light, and transmitted through the dichroic mirror 17.

On the other hand, the p-polarized blue color light transmitted through the dichroic mirror 17 enters the retardation plate 20. The retardation plate 20 is made of a stretched film, a crystal, etc., so as to function as a quarter wave plate in the vicinity of a dominant emission wavelength of the semiconductor lasers 3, 4. The light converted into circularly polarized light by the retardation plate 20 is phase-inverted by the reflection plate 21, and reenters the retardation plate 20, thereby being converted into s-polarized light. The reflection plate 21 is formed by disposing an aluminum reflective film, a dielectric film, etc., on a glass substrate. The blue color light converted into s-polarized light is reflected by the dichroic mirror 17. Note here that, instead of the configuration in which light transmitted through the retardation plate 20 is reflected directly by the reflection plate 21, the light may be condensed using a condenser lens first and then be reflected by the reflection plate 21.

Figure 5:
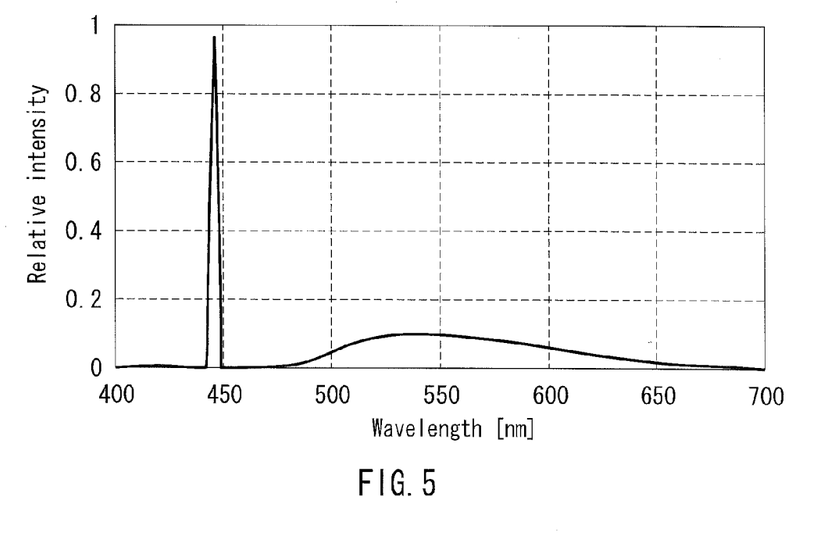
FIG. 5 is a graph showing a spectral characteristic of the light source device.

Thus, the fluorescent lights of green and red components from the fluorescence emission plate 19 and the blue color light from the semiconductor lasers 3, 4 are combined by the dichroic mirror 17, thereby exiting as white light. FIG. 5 shows a spectral characteristic of the exiting white light. It is understood that a emission property with a favorable white balance can be obtained by the yellow fluorescent light containing green and red components and the blue color light of the semiconductor laser.

As described above, with a pair of solid-state light source units disposed so that a plurality of semiconductor lasers are opposite to each other in an alternate arrangement, and a reflection unit configured so as to increase the density of light beams from the plurality of semiconductor lasers after reflection, the light source device of the present embodiment can condense and combine the light beams from the plurality of semiconductor lasers efficiently, while having a compact configuration. Further, since blue color light from the solid-state light source units is polarization-separated by one dichroic mirror and yellow color light emitted by excitation with one of the separated light is combined with the other separated light so as to obtain white light, it is possible to configure a compact, high-brightness light source device emitting well white-balanced white light highly efficiently.

Embodiment 2

Figure 6:
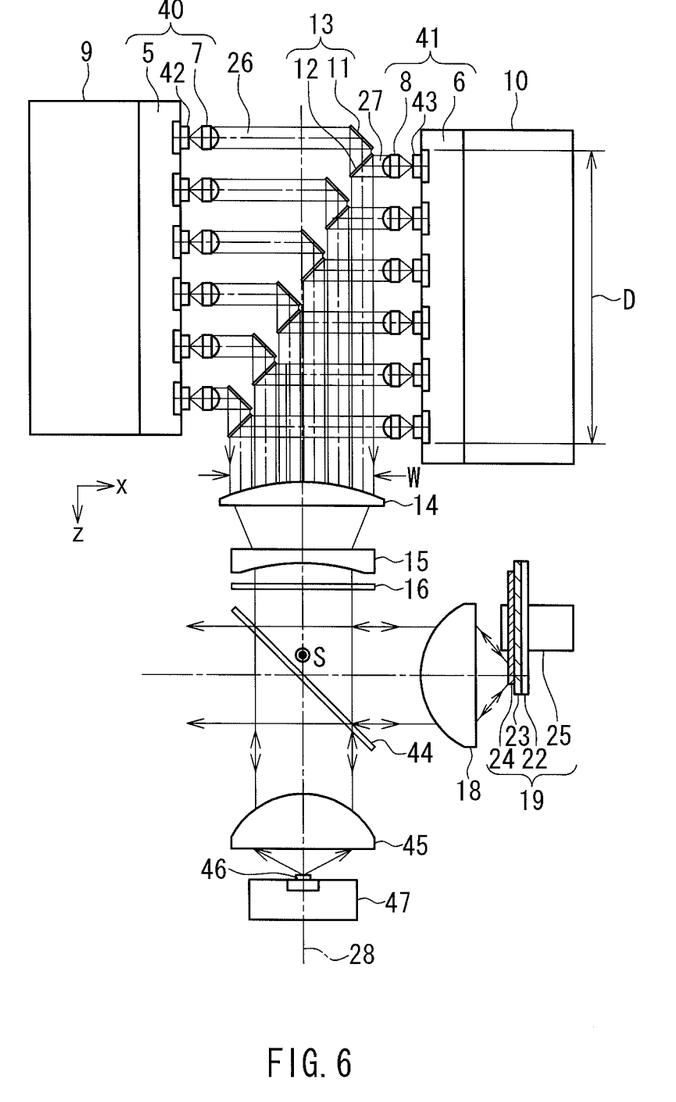
FIG. 6 is a front view showing a configuration of a light source device according to Embodiment 2 of the present invention.

FIG. 6 is a front view showing a configuration of a light source device in Embodiment 2 of the present invention. The light source device includes two solid-state light source units, i.e., first and second solid-state light source units 40, 41, which have the same configuration as those of Embodiment 1, and have substantially the same configuration as the light source device of Embodiment 1. Therefore, the same elements as those in Embodiment 1 are given the same reference numerals, and the repeated descriptions will be omitted. The configuration of the present embodiment is different from that of Embodiment 1 in that, as blue color light to be combined for obtaining white light, blue color light of a light-emitting diode is used in place of exiting light from semiconductor lasers 42, 43.

In the configuration of FIG. 6, light entering a dichroic mirror 44 from the first and second solid-state light source units 40, 41 is polarized in one direction. In other words, the semiconductor lasers 42, 43 of the first and second solid-state light source units 40, 41 are disposed so that substantially 100% of exiting light enters the dichroic mirror 44 as s-polarized light. Further, the blue reflection dichroic mirror 44 having a spectral characteristic different from that of the dichroic mirror 17 of FIG. 1A is used. Further, a solid-state light source unit composed of a condenser lens 45 (second condensing part), a light-emitting diode 46 and a heat sink 47 is provided in place of the retardation plate 20 and the reflection plate 21 in FIG. 1A.

In each of the first and second solid-state light source units 40, 41, eighteen (6×3) semiconductor lasers 42, 43 are disposed two-dimensionally on the heat-dissipation plates 5, 6 at a predetermined interval, and the condensing lenses 7, 8 are disposed so as to correspond to the semiconductor lasers 42, 43, respectively. The blue semiconductor lasers 42, 43 emit linearly polarized light having a wavelength ranging from 440 nm to 455 nm. The semiconductor lasers 42, 43 are disposed in the yz plane so as to form a staggered arrangement, which is identical to Embodiment 1.

Lights emitted from the plurality of semiconductor lasers 42, 43 are condensed by the corresponding condensing lenses 7, 8 and converted into parallel light beams 26, 27, respectively. The light beam 26 is reflected by the total-area reflection mirror 11 at the incident angle of 45°, transmitted through the partial-area reflection mirror 12, and enters the lens 14. The light beam 27 is reflected by the partial-area reflection mirror 12 at the incident angle of 45°, and enters the lens 14. The plurality of partial-area reflection mirrors 12 are disposed so that the angle θ of the partial-area reflection mirror 12 becomes 21.5°, and the light beam width W is reduced to 38% with respect to the light beam width D. The plurality of total-area reflection mirrors 11 are disposed similarly. Thus, the light beams from the plurality of first and second solid-state light source units 40, 41 can be combined densely.

The diameter of the light beams is reduced further by the lenses 14, 15. The light beams are diffused by the diffusion plate 16, and then enter the dichroic mirror 44. The light reflected by the dichroic mirror 44 is condensed by the condenser lens 18, superimposed so that spot light having a diameter of 1-3 mm is formed, and enters the fluorescence emission plate 19.

The phosphor layer 24 excited by the spot light emits green and red component lights. By rotating the fluorescence emission plate 19, the temperature rise of the phosphor due to excitation light can be suppressed, and the fluorescence conversion efficiency can be maintained stably. The fluorescent lights of green and red components exiting from the fluorescence emission plate 19 are condensed by the condenser lens 18 again, converted into substantially parallel light, and transmitted through the dichroic mirror 44.

Meanwhile, the blue color light emitted by the light-emitting diode 46 is condensed by the condenser lens 45, converted into substantially parallel light, and reflected by the dichroic mirror 44. The light-emitting diode 46 is cooled by the heat sink 47, whereby the emission property is maintained stably.

Thus, the fluorescent lights of green and red components from the fluorescence emission plate 19 and the blue color light from the light-emitting diode 46 are combined by the dichroic mirror 44, thereby exiting as white light. By using not the semiconductor laser light but the light of the light-emitting diode 46, it is possible to obtain light without the speckles generated peculiarly to laser light. Note here that, although one light-emitting diode 46 is used in the configuration of FIG. 6, a plurality of light-emitting diodes may be used.

As described above, with a pair or a plurality of pairs of solid-state light source units disposed so that a plurality of semiconductor lasers are opposite to each other in an alternate arrangement, and a reflection unit configured so as to increase the density of light beams from the plurality of semiconductor lasers after reflection, the light source device of the present embodiment can condense and combine the light beams from the plurality of semiconductor lasers efficiently, while having a compact configuration. Further, since yellow fluorescent light emitted by excitation with blue color light from the solid-state light source units is combined with blue color light from the light-emitting diode, it is possible to configure a compact, high-brightness light source device emitting high grade, well white-balanced white light without generation of speckles.

Embodiment 3

Figure 7:
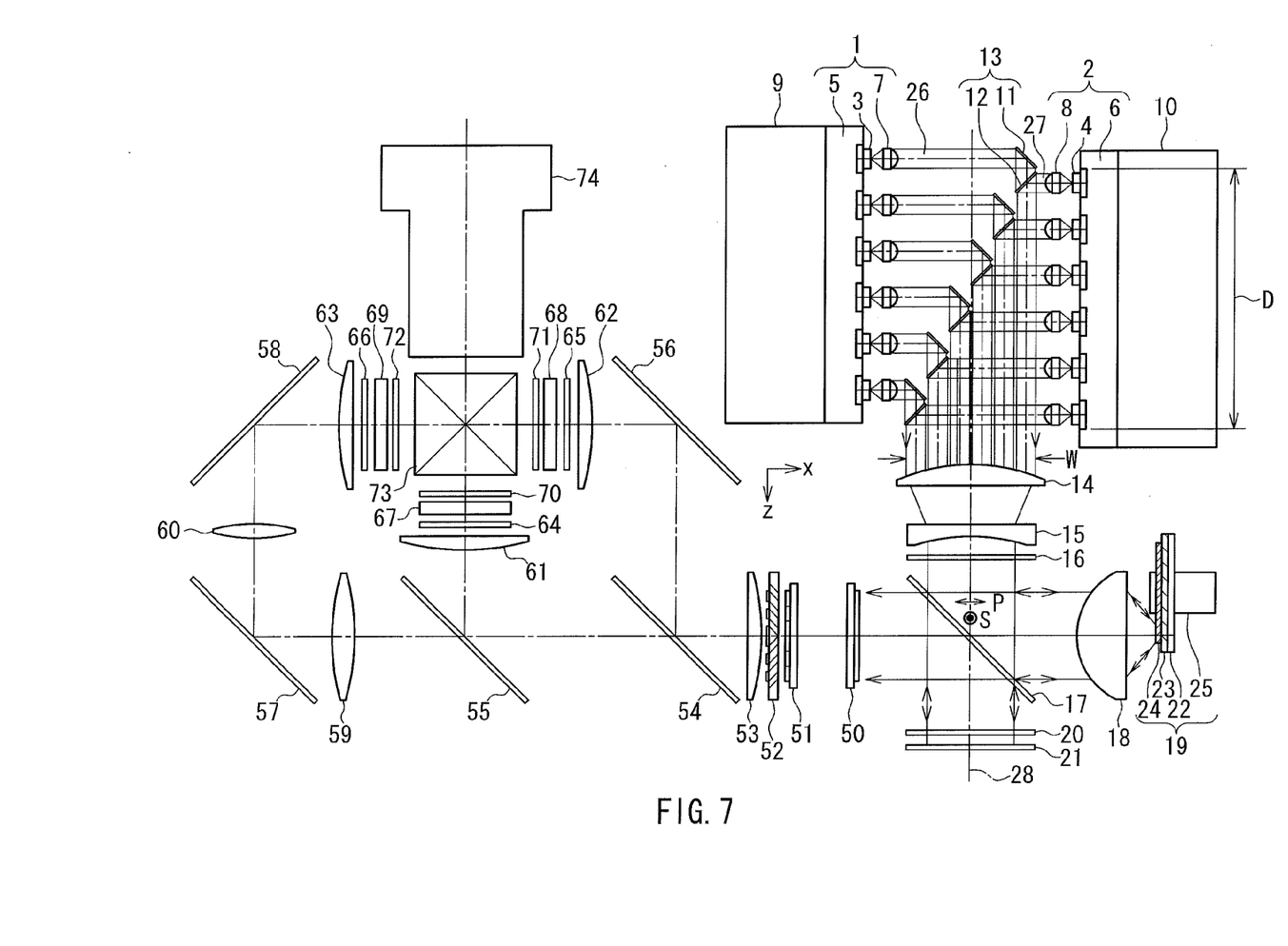
FIG. 7 is a front view showing a configuration of a projection display apparatus according to Embodiment 3 of the present invention.

FIG. 7 shows a projection display apparatus in Embodiment 3 of the present invention. This projection display apparatus makes use of the light source device in Embodiment 1. Therefore, elements of the light source device are given the same reference numerals as those in Embodiment 1, and the repeated descriptions will be omitted.

In the present embodiment, as a light valve, an active-matrix type transmission-type liquid crystal panel is used. A mode thereof is TN or VA and a thin-film transistor is formed in a pixel region.

An illumination portion for condensing exiting light from the dichroic mirror 17 so as to form illumination light is composed of first and second lens array plates 50, 51, a polarization converting optical element 52 and a superimposing lens 53. A color separation portion for color-separating the illumination light having passed through the superimposing lens 53 and allowing the separated color lights to enter liquid crystal light valves for the respective colors is composed of a blue reflection dichroic mirror 54, a green reflection dichroic mirror 55, reflection mirrors 56, 57, 58 and relay lenses 59, 60.

A liquid crystal light valve portion for spatially modulating each of the separated color lights so as to form image lights is composed of field lenses 61, 62, 63, incident-side polarizing plates 64, 65, 66, liquid crystal panels 67, 68, 69 and exit-side polarizing plates 70, 71, 72. A projection optical system for combining the image lights of the respective color lights and magnifying and projecting the combined image light is composed of a color combining prism 73 including a red reflection dichroic mirror and a blue reflection dichroic mirror, and a projection lens 74.

In the above configuration, white light from the light source device enters the first lens array plate 50 composed of a plurality of lens elements. The light beam entered the first lens array plate 50 is divided into a large number of light beams. The lens elements of the first lens array plate 50 have an aperture shape similar to that of the liquid crystal panels 67, 68, 69. The large number of the divided light beams converge onto the second lens array plate 51 composed of a plurality of lenses. The focal length of the lens element of the second lens array plate 51 is determined so that the first lens array plate 50 and the liquid crystal panels 67, 68, 69 are substantially in a conjugate relationship. The light emitted from the second lens array plate 51 enters the polarization converting optical element 52. The polarization converting optical element 52 is formed of a polarization separating prism and a half wave plate, and converts natural light from the light source device into light having one polarization direction. The light from the polarization converting optical element 52 enters the superimposing lens 53. The superimposing lens 53 has a function of superimposing light exiting from each of the lens elements of the second lens array plate 51 and illuminating the liquid crystal panels 67, 68, 69.

Light from the superimposing lens 53 is separated into blue, green and red color lights by the blue reflection dichroic mirror 54 and the green reflection dichroic mirror 55. The green color light is transmitted through the field lens 61 and the incident-side polarizing plate 64, thereby entering the liquid crystal panel 67. The blue color light is reflected by the reflection mirror 56, transmitted through the field lens 62 and the incident-side polarizing plates 65, thereby entering the liquid crystal panel 68. The red color light is transmitted through and refracted by the relay lenses 59, 60, reflected by the reflection mirrors 57, 58, and transmitted through the field lens 63 and the incident-side polarizing plates 66, thereby entering the liquid crystal panel 69.

The three liquid crystal panels 67, 68, 69 change the polarization state of the incident light in accordance with the control of the voltage to be applied to pixels according to a video signal. The incident-side polarizing plates 64, 65, 66 and the exit-side polarizing plates 70, 71, 72 are disposed on both sides of the liquid crystal panels 67, 68, 69 respectively, such that their transmission axes are orthogonal to one another. Thereby, light is modulated spatially in accordance with the polarization state of the liquid crystal panels 67, 68, 69, and thus green, blue and red image lights are formed. The color lights respectively transmitted through the exit-side polarizing plates 70, 71, 72 enter the color combining prism 73. The red color light and the blue color light are reflected by the red reflection dichroic mirror and the blue reflection dichroic mirror, respectively, combined with green color light, and then enter the projection lens 74. The light entered the projection lens 74 is magnified and projected on a screen (not shown).

As described above, since the light source device is composed of a plurality of solid-state light sources and emits well white-balanced white light with high brightness, a long-life, high-brightness projection display apparatus can be realized. Further, since the light valve is not composed of a time-division system but composed of three liquid crystal panels utilizing polarization, a bright, high-definition projection image with favorable color reproducibility and without color breaking can be obtained.

As described above, the projection display apparatus of the present embodiment uses a compact light source device in which by a pair or a plurality of pairs of solid-state light source units and a reflection unit, light beams from semiconductor lasers are efficiently condensed, polarization-separated, and white light is obtained by combining yellow color light emitted by exciting a phosphor using one of the separated light and the other separated blue color light of the semiconductor lasers. Thereby, a compact, high-brightness projection display apparatus can be configured. Note here that the light source device is not limited to the light source device of Embodiment 1, and the same effect can be obtained using the light source device of Embodiment 2.

Further, the liquid crystal light valve is not limited to the transmission-type liquid crystal panel, and may be a reflection-type liquid crystal panel. By using the reflection type liquid crystal panel, a compact, high-definition projection display apparatus can be configured. Further, as a light valve, a light valve causing deflection using three mirrors can be used.

Embodiment 4

Figure 8:
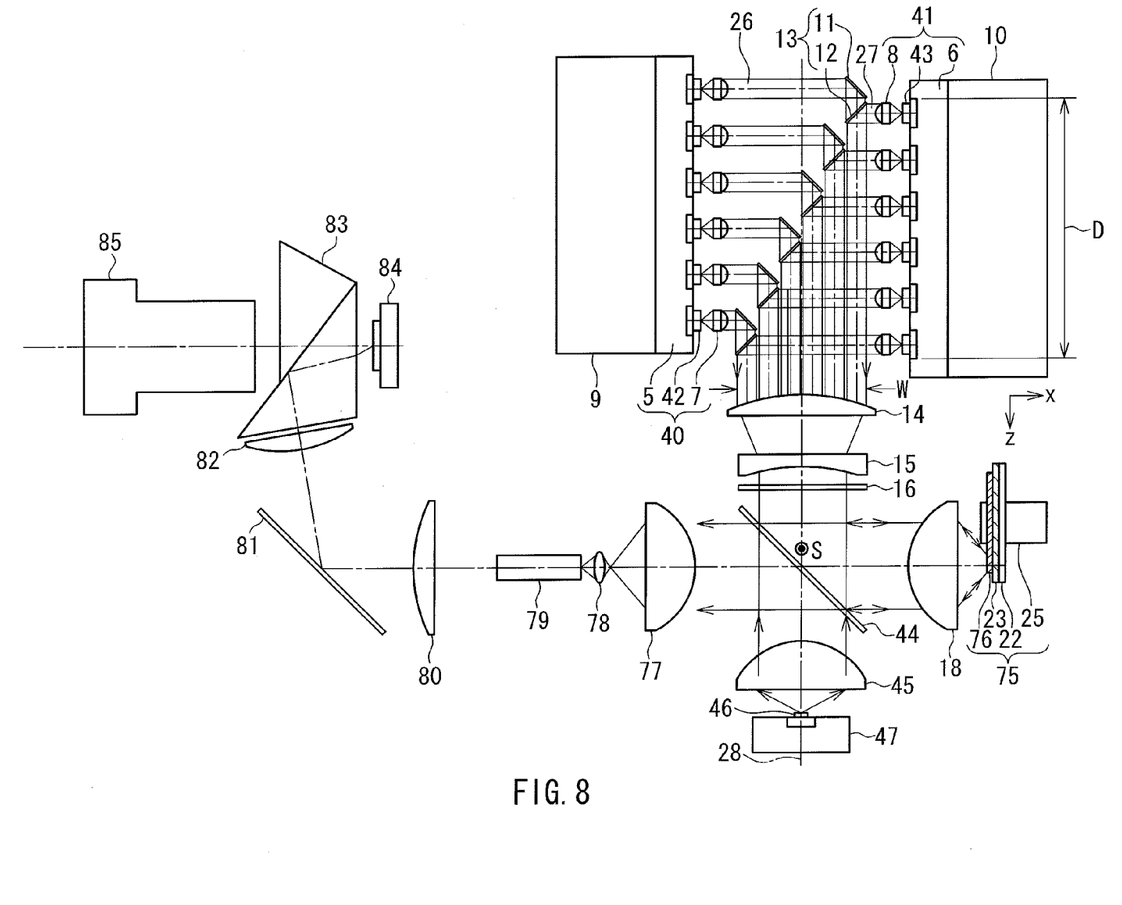
FIG. 8 is a front view showing a configuration of a projection display apparatus according to Embodiment 4 of the present invention.

FIG. 8 shows a projection display apparatus in Embodiment 4 of the present invention. This projection display apparatus uses a partially modified light source device in Embodiment 2. Therefore, the same elements as those in Embodiment 2 are given the same reference numerals, and the repeated descriptions will be omitted.

In the present embodiment, one DMD of a time-division system is used as a light valve. Further, the light source device of the present embodiment has the same configuration as the light source device of Embodiment 2, expect for the configuration of a phosphor layer 76 formed on a fluorescence emission plate 75. In the phosphor layer 76 of the fluorescence emission plate 75, a planar region is divided into three in a rotation direction, and a phosphor region emitting green component, a phosphor region emitting red component and a transmission region are formed thereon, respectively.

An illumination portion for forming illumination light by exiting light from the dichroic mirror 44 in the light source device is composed of condenser lenses 77, 78, a rod 79, a relay lens 80, a reflection mirror 81, a field lens 82 and a total reflection prism 83. The illumination light is modulated spacially by a DMD 84 for forming image light, which then is magnified and projected by a projection lens 85.

Figure 9A:
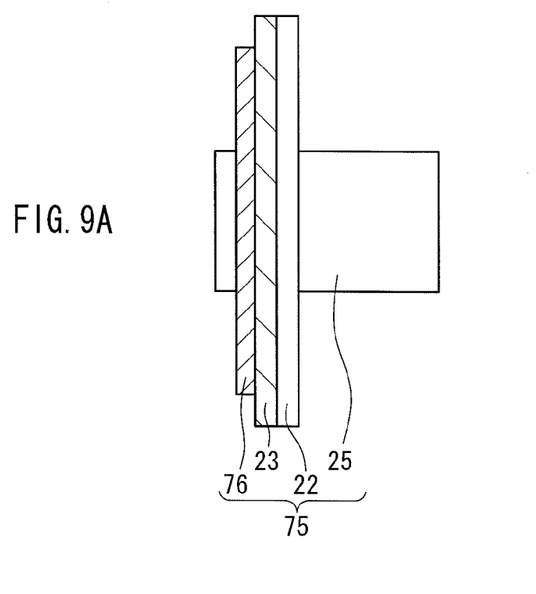
FIG. 9A is a front view showing a configuration of a fluorescence emission plate in a light source device of the projection display apparatus.
Figure 9B:
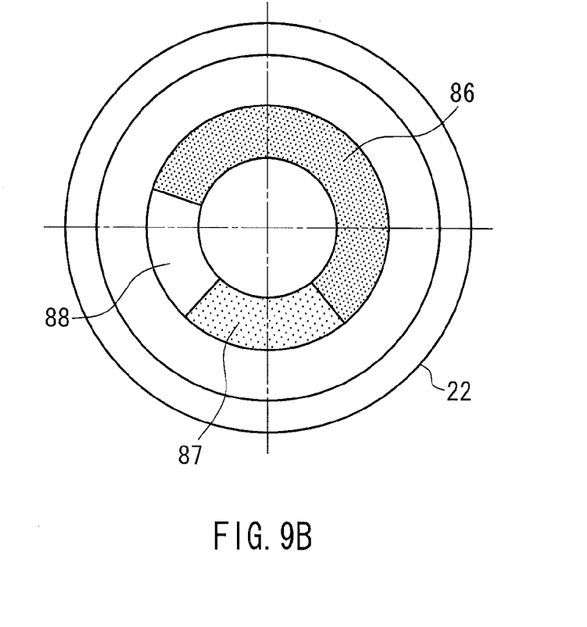
FIG. 9B is a side view showing a configuration of the fluorescence emission plate.

FIGS. 9A and 9B show a configuration of the fluorescence emission plate. FIG. 9A is a front view thereof, and FIG. 9B is a side view thereof. In the phosphor layer 76 of the fluorescence emission plate 75, a phosphor region 86 emitting green component, a phosphor region 87 emitting red component and a transmission region 88 are formed respectively in the three regions that are divided in the rotation direction. As the phosphor of the phosphor region 86, a Ce-activated YAG yellow phosphor that is excited by blue component light and emits fluorescence containing green component is used. Specifically, a phosphor having an emission peak in the vicinity of 540 nm and containing relatively less red component is selected. As the phosphor of the phosphor region 87, a nitride phosphor that is excited by blue component light and emits fluorescence containing red component is used. As the nitride phosphor, $Ca_2Si_5N_8$:Eu may be used. This phosphor has an emission peak in the vicinity of a wavelength of 610 nm and a half-width of about 100 nm, emitting light in a wide wavelength range. Further, the decrease in the conversion efficiency due to temperature rise is less than that of the YAG yellow phosphor.

The green and red component lights that are emitted by the excited phosphor layer 76 (phosphor regions 86, 87) exit from the fluorescence emission plate 75. Meanwhile, in the transmission region 88, when blue component excitation light enters the region, the light is reflected by the reflective film 23 and exits from the fluorescence emission plate 75. In the period of the transmission region 88, the oscillation of the semiconductor lasers 42, 43 is in an OFF state.

The light-emitting diode 46 is controlled to emit blue color light in the period of the transmission region 88 of the fluorescence emission plate 75. Thus, by differentiating the emission period among color lights corresponding to the rotation angle of the fluorescence emission plate 75 and color light of the light-emitting diode 46, the light source device emits green, red and blue color lights in a time series.

The light from the light source device is condensed onto an incident surface of the rod 79 by the condenser lenses 77, 78. The rod 79 is a columnar glass with rectangular-shaped incident and exit surfaces. The light that entered the rod 79 propagates to the exit surface of the rod 79 through multiple reflection including total reflection. A light beam that is not uniform at the incident surface is transformed into a uniform light beam at the exit surface. The exiting light from the rod 79 is refracted and reflected by the relay lens 80, the reflection mirror 81, the field lens 82 and the total reflection prism 83, and then enters the MID 84.

A distance between surfaces as well as a focal length of each of the relay lens 80 and the field lens 82 are determined so that the exit surface of the rod 79 and the surface of the DMD 84 are in a conjugate relationship. The field lens 82 causes illumination light to be condensed onto the projection lens 85 efficiently. The total reflection prism 83 has a function of totally reflecting illumination light and transmitting projection light from the DMD 84. The exiting light from the rod 79 takes the shape of a rectangular illumination similar to the shape of a display region on the DMD 84, and illuminates the surface of the DMD 84 uniformly with high efficiency.

Among lights that entered the DMD 84, only light beams that are required for forming an image are deflected in accordance with a video signal and after transmitting through the total reflection prism 83, enter the projection lens 85, thereby being magnified and projected. Since the light valve is composed of one MID, it is possible to configure a compact, lightweight projection display apparatus.

As described above, the projection display apparatus of the present embodiment uses one mirror-deflection type light valve and a light source device in which light beams from semiconductor lasers are condensed efficiently by a pair of or a plurality of pairs of solid-state light source units and a reflection unit, and green and red color lights emitted by exciting a phosphor is combined with blue color light from a light-emitting diode for emitting green, red and blue color lights in time series. Thereby, it is possible to configure a compact, high-brightness projection display apparatus.

What is claimed is:

1. A light source device, comprising:
first and second solid-state light source units that are disposed opposite to each other, each unit including a plurality of solid-state light sources and a plurality of condensing lenses;
a reflection unit that reflects exiting light beams from the first and second solid-state light source units in one direction;
a first condensing part that condenses reflected light beams from the reflection unit;
a fluorescence emission plate that is excited with light condensed by the first condensing part and emits fluorescence and has a phosphor layer disposed on a light incident side thereof and a reflective film disposed at the back of the phosphor layer in a light incident direction,
a dichroic mirror that polarization separates light from the first condensing part into a first polarization component and a second polarization component and that combines blue color light and green and red color lights;
a retardation plate that converts a polarization direction of the second polarization component; and
a reflection plate that reflects light having been transmitted through the retardation plate so that the light reenters the retardation plate,
wherein the plurality of solid-state light sources in each of the first and second solid-state light source units are arranged two-dimensionally with optical axes thereof being oriented in an x-axis direction in a yz plane in a rectangular coordinate system composed of x, y and z axes,
each column of the solid-state light sources aligned in the z-axis direction in the first solid-state light source unit and each column of the solid-state light sources aligned in the z-axis direction in the second solid-state light source unit are arranged alternately in the y-axis direction,
the reflection unit is disposed so as to reflect each of the exiting light beams from the first and second solid-state light source units in the z-axis direction and arrange the reflected light beams into a two-dimensional array in a xy plane, in which a density of the reflected light beams in the x-axis direction is higher than a density of an arrangement of the solid-state light sources in the z-axis direction,
the first polarization component enters the fluorescence emission plate and fluorescence emitted is reflected toward the dichroic mirror, and
green and red color lights from the fluorescence emission plate and blue color light from the reflection plate are combined by the dichroic mirror and exit as white light.

2. The light source device according to claim 1, wherein the retardation plate is a quarter wave plate.

3. A light source device comprising:
first and second solid-state light source units that are disposed opposite to each other, each unit including a plurality of solid-state light sources and a plurality of condensing lenses;
a reflection unit that reflects exiting light beams from the first and second solid-sate light source units in one direction;
a first condensing part that condenses reflected light beams from the reflection unit;

a fluorescence emission plate that is excited with light condensed by the first condensing part and emits fluorescence and has a phosphor layer disposed on a light incident side thereof and a reflective film disposed at the back of the phosphor layer in a light incident direction, a dichroic mirror that reflects light from the first condensing part, and separates or combines blue color light and green and red color lights;

a light-emitting diode; and a second condensing part that condenses light radiated from the light-emitting diode, wherein the plurality of solid-state light sources in each of the first and second solid-state light source units are arranged two-dimensionally with optical axes thereof being oriented in an x-axis direction in a yz plane in a rectangular coordinate system composed of x, y and z axes, each column of the solid-state light sources aligned in the z-axis direction in the first solid-state light source unit and each column of the solid-state light sources aligned in the z-axis direction in the second solid-state light source unit are arranged alternately in the y-axis direction, the reflection unit is disposed so as to reflect each of the exiting light beams from the first and second solid-state light source units in the z-axis direction and arrange the reflected light beams into a two-dimensional array in a xy plane, in which a density of the reflected light beams in the x-axis direction is higher than a density of an arrangement of the solid-state light sources in the z-axis direction, the fluorescence emission plate is excited by light from the first condensing part having been reflected by the dichroic mirror and fluorescence emitted is reflected toward the dichroic mirror, and color light from the fluorescence emission plate and color light from the light-emitting diode having been condensed by the second condensing part are combined by the dichroic mirror and exit as white light.

4. A projection display apparatus, comprising:

a color light source device that emits green, red and blue color lights in time series;

an illumination portion that condenses light from the color light source device so as to form illumination light;

a mirror-deflection type light valve that spatially modulates the illumination light so as to form image light; and a projection lens that magnifies and projects image light formed by the mirror-deflection type light valve, wherein the color light source comprises:

first and second solid-state light source units that are disposed opposite to each other, each unit including a plurality of solid-state light sources and a plurality of condensing lenses;

a reflection unit that reflects exiting light beams from the first and second solid-state light source units in one direction;

a first condensing part that condenses reflected light beams from the reflection unit;

a fluorescence emission plate that is excited with light condensed by the first condensing part and emits fluorescence, a dichroic mirror that reflects light from the first condensing part, and separates or combines blue color light and green and red color lights;

a light-emitting diode that emits blue color light; and a second condensing part that condenses light radiated from the light-emitting diode, wherein the plurality of solid-state light sources in each of the first and second solid-state light source units are arranged two-dimensionally with optical axes thereof being oriented in an x-axis direction in a yz plane in a rectangular coordinate system composed of x, y and z axes, each column of the solid-state light sources aligned in the z-axis direction in the first solid-state light source unit and each column of the solid-state light sources aligned in the z-axis direction in the second solid-state light source unit are arranged alternately in the y-axis direction, the reflection unit is disposed so as to reflect each of the exiting light beams from the first and second solid-state light source units in the z-axis direction and arrange the reflected light beams into a two-dimensional array in a xy plane, in which a density of the reflected light beams in the x-axis direction is higher than a density of an arrangement of the solid-state light sources in the z-axis direction, the fluorescence emission plate is excited by light from the first condensing part having been reflected by the dichroic mirror and fluorescence emitted is reflected toward the dichroic mirror, color light from the fluorescence emission plate and color flight from the light-emitting diode having been condensed by the second condensing part are combined by the dichroic mirror and exit from the dichroic mirror, the fluorescence emission plate is divided in a rotation direction so that a green phosphor region emitting fluorescent light of green color component, a red phosphor region emitting fluorescent light of red color component and a transmission region are formed, and the light-emitting diode is caused to emit light only in a period in which light from the first condensing part passes through the transmission region, and at the same time, light emission of the plurality of solid-state light sources is caused to stop.

* * * * *